(No Model.) 2 Sheets—Sheet 2.
J. H. STAPLES.
TURBINE WATER WHEEL.
No. 552,266. Patented Dec. 31, 1895.
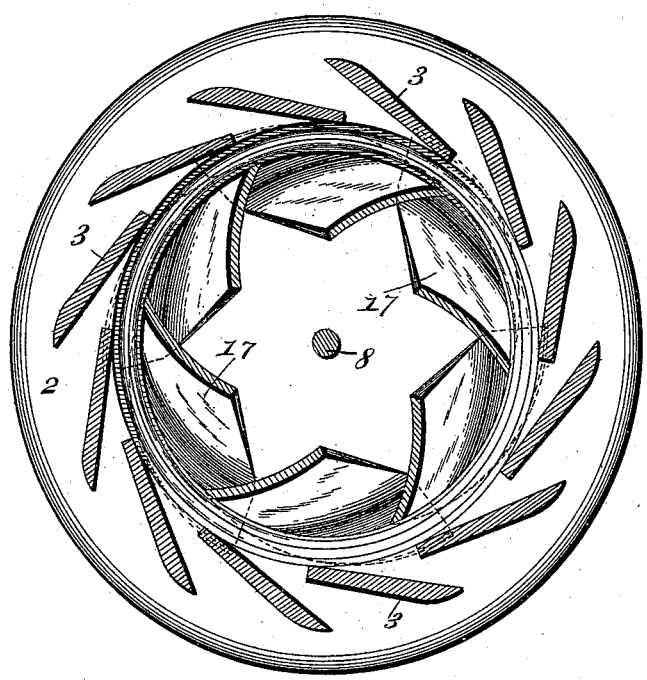
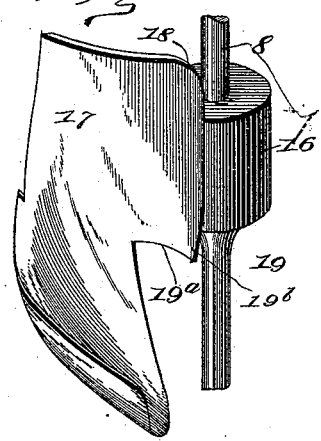

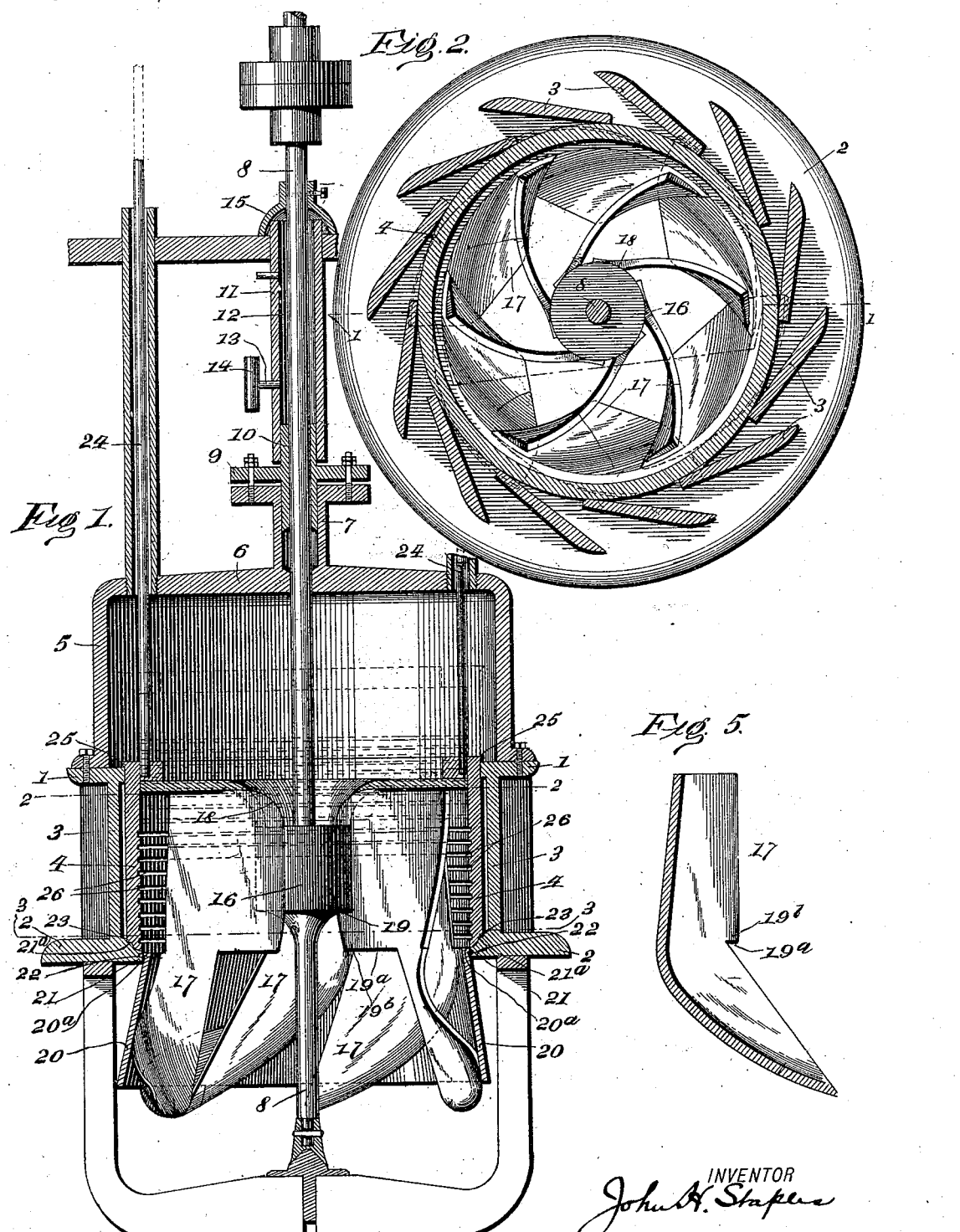

UNITED STATES PATENT OFFICE.

JOHN H. STAPLES, OF YORK, PENNSYLVANIA.

TURBINE WATER-WHEEL.

SPECIFICATION forming part of Letters Patent No. 552,266, dated December 31, 1895.

Application filed April 2, 1895. Serial No. 544,171. (No model.)

*To all whom it may concern:*

Be it known that I, JOHN H. STAPLES, a citizen of the United States, residing at York, in the county of York and State of Pennsylvania, have invented certain new and useful Improvements in Turbine Water-Wheels; and I do hereby declare the following to be a full, clear, and exact description of the invention, such as will enable others skilled in the art to which it appertains to make and use the same.

My invention relates to improvements in turbine water-wheels, the invention residing particularly in the gate for regulating the supply of water to the wheel, and in the provision of means whereby an increase of power is obtained by enabling a larger quantity of water to be admitted to the wheel than can be ordinarily admitted in a wheel of equal size.

The invention consists in the construction and combinations of parts which will be hereinafter more fully described and claimed.

In the drawings forming part of this specification, Figure 1 represents a vertical sectional view of my wheel and its coacting parts, the lower part of said figure being taken on the line 1 1 of Fig. 2 and the upper part being taken centrally. Fig. 2 is a horizontal section on the line 2 2 of Fig. 1. Fig. 3 is a similar section on the line 3 3 of Fig. 1. Fig. 4 is a detail perspective view of the hub of my wheel, showing one of the blades or buckets connected thereto; and Fig. 5 is a detached sectional view showing the shape of the lower part of one of my blades or pockets.

Like reference-numerals indicate like parts in the various views.

1 and 2 represent respectively the upper and lower annular rings, with which are integrally formed the pitch-water blades 3 3, arranged substantially tangential to the outer periphery of the gate 4 to which they lead. The dome 5 is secured upon the upper ring 1 and the top 6 thereof is extended upwardly at its center, forming a bearing 7 for the main drive-shaft 8. The part 7 has a horizontal flange thereon, with which is connected a similar flange 9 of a gland 10 surrounding the shaft 8. Between the lower end of the gland 10, the part 7 and the upper edge of the top 6 is inserted suitable packing, forming a tight bearing for the shaft 8. Surrounding the upper end of the gland 10 is a protecting-cylinder 11, between which and the shaft 8 is left an annular chamber 12. Connected to one side of the protecting-cylinder 11 and leading into the annular chamber 12 is a pipe 13 leading from a suitable water-filter 14, by means of which filtered water for lubricating purposes is admitted to the bearing part of the shaft 8. Fitting over the upper end of the cylinder 11 is a cap 15 adjustably secured to the shaft 8 for preventing the admission of dust or dirt to the bearing parts of said shaft. Suitable means for transmitting power are connected to the upper end of the shaft 8. The lower end of this shaft 8 is cut out or recessed and fits over a pointed end of a wooden rod or shaft, forming a step-bearing therewith. Secured to this shaft 8 is the hub 16 of my turbine wheel. This hub has formed integral therewith a series of blades or buckets 17, which along their inner edges or points of connection with the hub 16 extend in a vertical direction. The upper edge is rounded, as shown at 18, and the upper part thereof is curved in a substantially tangential direction to the hub 16, as clearly shown in Fig. 2. This curvature gradually approaches a straight line down to a point at about the middle of the blade, and from there on they are curved in an opposite direction, as shown in Figs. 1 and 4. It will thus be seen that the impact face of the upper part of the blades 17 is convex, and the lower part thereof, which is operated by the gravity of the water admitted to the wheel, is concave. The lower end of the hub 16, as shown in Figs. 1 and 4, is cut away, as seen at 19, forming a passage which permits the discharge of a part of the water admitted to the wheel centrally along the inside thereof. The blades 17 are also recessed at the point $19^a$ for an obvious purpose, and the lip $19^b$ thereby formed is curved outwardly for guiding the water to the lower part of said blades. The inner face of the lower part of the blades 17 being inclined outwardly enables a free discharge of the water flowing through the passage 19, preventing blocking or clogging up of the same. The outer edges of the lower part of the blades 17 have formed integral with them annular band 20 which serves to strengthen the parts and to guide the water to the lower part of said blade. This band is of larger diameter at its lower end than at its top, and its upper outer end is formed with a flange 20ª beveled inwardly and downwardly and moves in close relation to the internal flange 21 on the lower ring 2. This construction is for the purpose of permitting the free passage downward of any dirt or grit passing between said flanges 20ª and 21, and preventing grinding and wearing of the parts. The flange 21 has an annular groove 22 in it for a purpose which will presently appear. The upper edge of the flange 21 is formed with an inwardly-extending horizontal ledge 21ª and the remaining portion thereof is hollowed out annularly upon a curve to prevent breaking up of the water admitted through the pitch-water blades and to form a water-tight joint with the annular gate 4 resting thereon. This annular gate has a shoulder 23 at its lower outer edge formed to correspond with the ledge 21ª on said flange 21, and its remaining portion is cut away upon a convex curve corresponding to the hollowed-out portion of said flange 21, so that when the gate is in its lowered or closed position a perfectly tight joint is formed, which prevents the leakage of any water into the wheel.

The gate 4, as stated, is annular, and at its upper end is formed with inturned flanges to which are connected rods 24 extending upwardly, by means of which said gate may be raised or lowered for regulating the quantity of water admitted to the wheel. It also has at its upper outer edge a flange 25 having inclined edges, the same being substantially wedge-shaped. When the gate is in its lower or closed position, this inclined edge bears against the inner edge of the top ring 1, forming an absolutely water-tight joint and preventing the leakage of any water through the pitch-water blades into the dome of the casing. The inside of the gate 4 is formed with a series of annular horizontal parallel grooves 26 which are provided for the purpose of preventing the entrance of or cutting off the flow of water into the dome of the casing through the space between the outer edge of the blades 17 and the inner surface of the gate 4. Heretofore the water thrown outwardly by centrifugal force from the blades 17 would be forced upwardly into the dome and thereby a loss of power created. By my construction this outward tendency of the water is taken up by the grooves 26 and the same is prevented from being forced upward. A series of these grooves 26 have been provided for the purpose of having one at a point between the outer edge of the blades 17 and the gate 4 at any height to which the gate may be elevated. The groove 22 in the flange 21 is provided for preventing the leakage of the water downward.

My invention has now been sufficiently described, it is thought, to enable the operation thereof to be readily understood. Starting then with the gate 4 raised to the proper distance to supply the requisite amount of power—as shown, for example, in dotted lines in Fig. 1—the operation is as follows: Water admitted through the pitch-water blades 3 impinges against the upper part of the blades 17. By reason of the curvature of the blades at this point the water is led inwardly in a solid mass and prevented from being broken up and forming air-spaces, which results in a loss of power. The wheel is therefore partially rotated by reason of the impact caused by the horizontal flow of water against the upper part of said buckets 17. A portion of the water thus admitted is discharged through the passage 19 at the lower end of the hub 16 and is free to be discharged through the lower end of the casing. The remaining water falls by gravity and acts against the lower curved portion of the blades 17, and adds the power exerted thereby to that caused by the horizontal impact of the water against the upper part of the blades.

It will be seen that by the provision of the passage 19 at the lower part of the hub I am enabled to admit a greater amount of water in my wheel than could be done by a wheel of ordinary construction without this opening. I therefore obtain the power exerted by the horizontal impact of the additional water admitted, and also the power exerted by the weight of the water which acts on the concave lower part of the blades 17. This increase is calculated to be eleven per cent. When the gate 4 is closed I prevent the loss of power by reason of leakage by forming the joint described between the lower edge of the gate 4 and the upper edge of the flange 21, and also prevent leakage into the dome by reason of the wedge-shaped inclined face of the flange 25 on the upper outer edge of said gate. During the rotation of the wheel further leakage is prevented by reason of the grooves 26 in the gate 4 and the groove 22 in the flange 21. Thus all loss of power is prevented when the wheel is not in operation and also during the operation of the latter. Furthermore, increased power is obtained by reason of the construction which permits the increased flow of water through the wheel.

Having now described my invention, what I claim as new, and desire to secure by Letters Patent, is—

1. In a turbine water wheel, the combination with a casing having suitable openings therein for the admission of water to the interior thereof, of the wheel proper consisting of a hub having a drive-shaft mounted in suitable bearings connected thereto, said hub being cut away at its lower end, forming a passage for the water downwardly through the center, and blades or buckets secured to or integral with said hub, recessed at points adjacent to the cut-away portion of said hub, and having their upper faces for receiving the horizontal impact of the water, convex, and their lower faces for receiving the downward impulse of the water, concave, substantially as and for the purpose described.

2. In a turbine water wheel, the combination with a casing having suitable openings therein for the admission of water to the interior thereof, of the wheel proper consisting of a hub having a drive-shaft mounted in suitable bearings connected thereto, said hub being cut away at its lower end, forming a passage for the water downwardly through the center, and blades or buckets secured to or integral with said hub, recessed at points adjacent to the cut-away portion of said hub, and having their upper faces for receiving the horizontal impact of the water, convex, and turned upon a spiral from the hub outwardly, and their lower faces, for receiving the downward impulse of the water, concave, and turned upon a spiral, substantially as and for the purpose described.

3. In a turbine water-wheel, the combination with a casing formed of parallel annular rings and pitch-water blades integral therewith, the lower ring being formed with an internally-projecting flange, of the wheel proper mounted in said casing upon suitable bearings, and an annular band connected to, or formed integral with the blades of said wheel, the said band being of larger diameter at its lower end than at its top, and formed at its upper end with an outwardly extending flange beveled downwardly and inwardly and moving in close relation to the flange on said ring, whereby a free passage of dirt or grit is provided beneath said flanges and grinding of the parts prevented, substantially as described.

4. In a turbine water wheel, the combination with a casing formed of parallel annular rings and pitch-water blades integral therewith, the lower ring being formed with an internally-projecting flange hollowed out annularly and formed with a ledge and a water wheel proper located centrally of the casing, of an annular gate provided with means whereby the same may be raised or lowered for regulating the quantity of water admitted to the wheel, the said gate having a flange at its upper outer end provided with an inclined under surface, which, when the gate is closed, is adapted to rest upon and bear against the upper edge of the casing, a shoulder upon its lower end resting upon the ledge of the flange on said lower ring, and a cut away portion adapted to fit the cut away portion of said flange, substantially as and for the purpose described.

5. In a turbine water-wheel, the combination with a casing having suitable openings therein for the admission of water to the interior thereof, and a water-wheel proper located centrally of said casing, of an annular gate provided with means whereby the same may be raised or lowered for regulating the quantity of water admitted to the wheel, the said gate being provided on its inner surface with a series of horizontal parallel grooves, substantially as and for the purpose described.

6. In a turbine water-wheel, the combination with a casing formed of parallel annular rings and pitch-water blades integral therewith, the lower ring being formed with an internally projecting flange, having a horizontal ledge on its upper surface, and the corner of said flange cut out annularly on a curve, and a wheel proper mounted centrally within said casing upon suitable bearings, of an annular gate between said wheel and said casing provided with suitable means for raising and lowering the same to regulate the quantity of water admitted to said wheel, the said gate having an annular shoulder formed upon its lower edge corresponding with the ledge on said flange, and cut away along the remainder of said edge corresponding to the cut-out portion of said flange, whereby when said gate is closed a perfectly water-tight joint is formed between said gate and said flange, and whereby when said gate is opened, the flow of water to the wheel is permitted in an unbroken mass, substantially as described.

In testimony whereof I have signed this specification in the presence of two subscribing witnesses.

JOHN H. STAPLES.

Witnesses:
WM. M. STOCKBRIDGE,
WM. L. LORD.